United States Patent Office 2,764,520
Patented Sept. 25, 1956

2,764,520

STABILIZED VITAMIN A COMPOSITIONS

Heinrich Kläui, Riehen, Switzerland, assignor to Hoffmann-La Roche Inc., Nutley, N. J., a corporation of New Jersey No Drawing. Application August 11, 1953, Serial No. 373,668

Claims priority, application Switzerland August 20, 1952

5 Claims. (Cl. 167—81)

When vitamins are to be given to domestic animals of any size, it is customary to add the same to the feedstuff. In order that the vitamins be well dispersed, they are normally premixed with a carrier substance, which is then dispersed in the feedstuff in the form of a powder or fine granulate. However, if this procedure is used for vitamin A, it is observed that the vitamin A content decreases rapidly during storage. Especially the presence of mineral substances, more particularly those containing certain trace elements, may exert such a destroying action on the vitamin A that the latter may be detected no longer after a few days.

The present invention provides a process for the manufacture of a preparation increasing the vitamin A content in feedstuff of excellent stability, which process comprises mixing vitamin A or an ester thereof with a carrier and with non-aromatic primary amines containing at least 8 carbon atoms. The invention further provides an alternative to the process just described, wherein gentisic aldehyde or the reaction product of the said primary amines with gentisic aldehyde (for example, the Schiff base obtained by reacting gentisic aldehyde and octadecyl amine) is also added, thus ensuring a further increase in stability. The components may be mixed together at once, or a part thereof may be brought together and then mixed with the remaining part, the sequence of the mixing operations being entirely uncritical. In certain cases it may be preferable first to adsorb the vitamin A on a carrier, whereupon the enriched carrier may be mixed with the amines; in other cases the preparation may be simplified if the vitamin A is first mixed with the amines.

The stabilizing action of the amines mentioned is so powerful that a product which in the absence of the said amines, when mixed with trace elements, would lose 80–90 percent of its vitamin A activity within 10 days, will lose only 10–20 percent if these amines are present. In most cases a content of 5–20 percent of the amines will exert an optimal stabilizing action on vitamin A. If, together with the amines, gentisic aldehyde or the reaction product of the latter with the primary amines is used, the loss of activity is even slower.

The amines may be mixed with the vitamin A and with the carrier in the form of a solution thereof in organic solvents, or they may alternatively be employed as solids or, respectively, in a fused state. To prepare the mixture, it may also be possible finely to disperse in water the water-insoluble amines; this may be done for example by transforming part of the amines into their acetates by adding acetic acid, the acetates formed acting as an emulsifier. The mixing together of the carrier, the amines and the vitamin A may be done, for example, by mere mixing, by spraying, by immersion or by fusion.

Carriers which are suitable in the present process may be chosen from all kinds of substances which are non-toxic and which do not destroy vitamin A, for example: magnesium oxide, magnesium hydroxide, dicalcium phosphate, tricalcium phosphate, calcium caseinate, casein, zein, soybean flower, oatmeal, cocoa, pectin, higher fatty acid amides, partial esters of polyhydroxy compounds with higher fatty acids, fatty acids, higher alcohols, hardened fats.

The amines may be alicyclic amines or straight-chain aliphatic amines; preference is to be given to aliphatic amines containing 12–18 carbon atoms.

*Example 1*

10 parts by weight of vitamin A palmitate are melted together with 20 parts by weight of octadecyl amine, 40 parts by weight of palmitic acid amide and 30 parts by weight of glycerol monostearate in an inert atmosphere. The fused mixture obtained is then transferred into a spray by pushing the same through a medium gauge nozzle, for example from a spraying pistol. As soon as the spray has cooled down sufficiently, for example in air, in an inert gas or in a liquid, such as water, a fine vitamin A containing powder is formed. The stability of the vitamin A in this form may be further increased by adding stabilizing agents to the fused mixture, such as, for example, ascorbyl palmitate, tocopherol, etc.

*Example 2*

31 parts by weight of vitamin A palmitate, 2 parts by weight of butyloxyanisol, 1 part by weight of ascorbyl palmitate, 2.5 parts by weight of lecithin, 16 parts by weight of dodecyl amine are well mixed together by slightly warming or by the addition of about 50 parts by weight of an organic solvent, such as ethyl acetate. The mixture is then added to 47 parts by weight of magnesium oxide and, if necessary, the whole is then dried in vacuo. The fine powder formed contains 500,000 I. U. of vitamin A per gram.

It is desirable for the obtainment of a vitamin A product of good stability that the carrier be pretreated by repeatedly evacuating and exposing the same to nitrogen or carbon dioxide and, immediately afterwards, by mixing the same with a fat and/or part of the stabilizing agents.

*Example 3*

50 parts by weight of pure vitamin A palmitate (containing 1.75 millions I. U. of vitamin A per gram), 10 parts by weight of gentisic aldehyde (2,5-dihydroxy-benzaldehyde), 20 parts by weight of lecithin, 10 parts by weight of butyloxyanisol are well mixed with 760 parts by weight of oatmeal, by stirring in an inert atmosphere in the dark. In order to obtain a free-flowing powder, 140 parts by weight of magnesium oxide are added. Upon spraying thereon 120 parts by weight of melted n-octadecyl amine, this vitamin A preparation has an increased stability against mineral salts.

*Example 4*

50 parts by weight of vitamin A palmitate, 12.5 parts by weight of the Schiff base from gentisic aldehyde and octadecyl amine (prepared by condensation in methanol of equivalent quantities of the components), 25 parts by weight of lecithin and 10 parts by weight of DL-α-tocopherol are well mixed with 750 parts by weight of oatmeal. The preparation is made free-flowing by adding thereto 140 parts by weight of magnesium oxide.

*Example 5*

300 parts by weight of pure vitamin A palmitate, 75 parts by weight of the Schiff base from gentisic aldehyde and octadecyl amine, 25 parts by weight of lecithin and 10 parts by weight of DL-α-tocopherol are adsorbed on 590 parts by weight of magnesium oxide. This vitamin A containing powder contains 500,000 I. U. of vitamin A per gram and is satisfactorily stable against mixtures of mineral salts.

Example 6

A solution of 30.6 parts by weight of vitamin A palmitate in 80 parts by weight of light petroleum ether and a solution of 16 parts by weight of octadecyl amine, 2 parts by weight of lecithin and 5 parts by weight of gentisic aldehyde in 80 parts by weight of warm methanol (50° C.) are mixed together with 46.4 parts by weight of magnesium oxide. While stirring, the solvents are distilled off in vacuo at room temperature. The powder obtained contains 480,000 I. U. of vitamin A per gram.

I claim:

1. A stabilized vitamin A composition comprising a vitamin A compound selected from the group consisting of vitamin A and esters thereof, a carrier for the vitamin A compound and an aliphatic primary alkyl amine containing 8 to 18 carbon atoms.

2. A stabilized vitamin A composition comprising vitamin A palmitate, magnesium oxide and octadecyl amine.

3. A stabilized vitamin A composition comprising vitamin A palmitate, magnesium oxide, octadecyl amine and gentisic aldehyde.

4. A stabilized vitamin A composition comprising a vitamin A ester, a carrier for the vitamin A ester, an aliphatic primary alkyl amine containing 8 to 18 carbon atoms and gentisic aldehyde.

5. A stabilized vitamin A composition comprising a vitamin A ester, a carrier for the vitamin A ester, an aliphatic primary alkyl amine containing 8 to 18 carbon atoms and the reaction product of gentisic aldehyde and an aliphatic primary alkyl amine containing 8 to 18 carbon atoms.

References Cited in the file of this patent

UNITED STATES PATENTS

| | | |
|---|---|---|
| 2,063,602 | Hunt | Dec. 8, 1936 |
| 2,469,377 | Flett | May 10, 1949 |